United States Patent
Wang (10) Patent No.: US 10,237,102 B2
(45) Date of Patent: Mar. 19, 2019

(54) INFORMATION TRANSMISSION METHOD, DEVICE, AND SYSTEM

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/558,969

(22) PCT Filed: Mar. 17, 2015

(86) PCT No.: PCT/CN2015/074411
§ 371 (c)(1),
(2) Date: Sep. 15, 2017

(87) PCT Pub. No.: WO2016/145616
PCT Pub. Date: Sep. 22, 2016

(65) Prior Publication Data
US 2018/0248726 A1    Aug. 30, 2018

(51) Int. Cl.
*H04L 27/00* (2006.01)
*H04L 27/26* (2006.01)
(Continued)

(52) U.S. Cl.
CPC ........ *H04L 27/2602* (2013.01); *H04L 1/0041* (2013.01); *H04L 1/0071* (2013.01);
(Continued)

(58) Field of Classification Search
CPC ... H04L 1/0071; H04L 1/0041; H04L 5/0016; H04L 5/0032; H04L 27/0006
(Continued)

(56) References Cited

U.S. PATENT DOCUMENTS

2011/0170435 A1* 7/2011 Kim ................... H04L 5/0023
370/252
2011/0228748 A1   9/2011 Han et al.
(Continued)

FOREIGN PATENT DOCUMENTS

CN   102340372 A   2/2012
CN   103685118 A   3/2014
(Continued)

OTHER PUBLICATIONS

Jang et al.,"A New Criterion for Retransmission in Type I H-ARQ Schemes of LDPC Coded OFDM Systems," 2009 IEEE 70th Vehicular Technology Conference Fall, XP055445129, Institute of Electrical and Electronics Engineers, New York, New York (Sep. 20-23, 2009).

*Primary Examiner* — Emmanuel Bayard
(74) *Attorney, Agent, or Firm* — Leydig, Voit & Mayer, Ltd.

(57) ABSTRACT

The present invention relates to the communications field and discloses an information transmission method, a device, and a system, so as to resolve a prior-art problem that resources are wasted when an incomplete subframe is used to send information after the information is encoded. In a specific solution, a first device generates T code blocks, generates N OFDM symbols according to the T code blocks, and transmits, in a first subframe, M of the N OFDM symbols to a second device according to a second sequence. The present invention is applied to information transmission.

18 Claims, 3 Drawing Sheets

A second device receives M of N OFDM symbols transmitted by a first device in a first subframe according to a second sequence — 301

(51) Int. Cl.
*H04L 1/00* (2006.01)
*H04L 27/34* (2006.01)
*H04L 1/08* (2006.01)
*H04L 5/00* (2006.01)
*H04W 16/14* (2009.01)

(52) U.S. Cl.
CPC .............. *H04L 1/08* (2013.01); *H04L 5/0016* (2013.01); *H04L 5/0032* (2013.01); *H04L 5/0053* (2013.01); *H04L 5/0094* (2013.01); *H04L 27/0006* (2013.01); *H04L 27/34* (2013.01); *H04W 16/14* (2013.01)

(58) Field of Classification Search
USPC .................................................. 375/260, 295
See application file for complete search history.

(56) References Cited

U.S. PATENT DOCUMENTS

| | | | |
|---|---|---|---|
| 2012/0120863 A1* | 5/2012 | Gou | ........................ H04L 5/001 370/312 |
| 2013/0235851 A1* | 9/2013 | Abu-Surra | ............ H04W 56/00 370/336 |
| 2015/0055616 A1 | 2/2015 | Kim et al. | |
| 2017/0279553 A1* | 9/2017 | Sadiq | .................. H04J 11/0073 |

FOREIGN PATENT DOCUMENTS

| | | | |
|---|---|---|---|
| EP | 2600551 A1 | 6/2013 | |
| WO | 2015031743 A1 | 3/2015 | |

\* cited by examiner

INFORMATION TRANSMISSION METHOD, DEVICE, AND SYSTEM

CROSS-REFERENCE TO RELATED APPLICATIONS

This application is a National Stage Application of International Application No. PCT/CN2015/074411, filed on Mar. 17, 2015, which is hereby incorporated by reference in its entirety.

TECHNICAL FIELD

The present invention relates to the communications field, and in particular, to an information transmission method, a device, and a system.

BACKGROUND

In a wireless communications system, each device needs to transmit information by using frequency resources. Frequency resources are also referred to as spectrums. Spectrums may be classified into licensed spectrums and unlicensed spectrums. The licensed spectrums are dedicated frequency resources of some operators, and the unlicensed spectrums are frequency resources for public use in a wireless communications network. With development of communications technologies, an amount of information transmitted in the wireless communications network increases on a daily basis, and a data throughput in the wireless communications network may be improved by preempting an unlicensed spectrum to transmit information, so as to better satisfy user requirements.

However, when a device preempts an unlicensed spectrum to perform data transmission, after the device successfully preempts a channel of the unlicensed spectrum, data may be sent at a random moment. Therefore, the device may not send data at a starting moment of a complete subframe, that is, the device may not send a complete subframe. In this case, data is encoded according to an original bit rate, and during sending, only a part of encoded data can be sent. Consequently, some encoded data still cannot be sent. In this way, to ensure correct decoding at a receive end, when retransmission is performed subsequently, a relatively low retransmission bit rate needs to be used, causing a waste of system resources.

SUMMARY

Embodiments of the present invention provide an information transmission method, a device, and a system, so as to resolve a prior-art problem that resources are wasted when an incomplete subframe is used to send information after the information is encoded.

To achieve the foregoing objective, the embodiments of the present invention use the following technical solutions:

According to a first aspect, an embodiment of the present invention provides an information transmission method, including:

generating, by the first device, T code blocks;

generating, by the first device, N orthogonal frequency division multiplexing OFDM symbols according to the T code blocks, where the N OFDM symbols are sorted according to a first sequence, and the N OFDM symbols are OFDM symbols transmitted in one subframe; and transmitting, by the first device in a first subframe, M of the N OFDM symbols to a second device according to a second sequence, where a sequence of the M OFDM symbols sorted according to the first sequence is different from a sequence of the M OFDM symbols sorted according to the second sequence, T and N are positive integers, and M is a positive integer less than N.

With reference to the first aspect, in a first possible implementation of the first aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the first aspect or the first possible implementation of the first aspect, in a second possible implementation of the first aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the first aspect to the second possible implementation of the first aspect, in a third possible implementation of the first aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the first aspect to the second possible implementation of the first aspect, in a fourth possible implementation of the first aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the first aspect to the fourth possible implementation of the first aspect, in a fifth possible implementation of the first aspect, the first subframe is a subframe on an unlicensed spectrum.

According to a second aspect, an embodiment of the present invention provides an information transmission method, including:

receiving, by a second device, M of N OFDM symbols transmitted by a first device in a first subframe according to a second sequence, where a sequence of the M OFDM symbols sorted according to the first sequence is different from a sequence of the M OFDM symbols sorted according to the second sequence, where the N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N.

With reference to the second aspect, in a first possible implementation of the second aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the second aspect or the first possible implementation of the second aspect, in a second possible implementation of the second aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the second aspect to the second possible implementation of the second aspect, in a third possible implementation of the second aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the second aspect to the second possible implementation of the second aspect, in a fourth possible implementation of the second aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the second aspect to the fourth possible implementation of the second aspect, in a fifth possible implementation of the second aspect, the first subframe is a subframe on an unlicensed spectrum.

According to a third aspect, an embodiment of the present invention provides a first device, including:

an encoding unit, configured to generate T code blocks;

a modulation unit, configured to generate N orthogonal frequency division multiplexing OFDM symbols according to the T code blocks generated by the encoding unit, where the N OFDM symbols are sorted according to a first sequence, and the N OFDM symbols are OFDM symbols transmitted in one subframe; and a sending unit, configured to transmit, in a first subframe, M of the N OFDM symbols generated by the modulation unit to a second device according to a second sequence, where a sequence of the M OFDM symbols sorted according to the first sequence is different from a sequence of the M OFDM symbols sorted according to the second sequence, T and N are positive integers, and M is a positive integer less than N.

With reference to the third aspect, in a first possible implementation of the third aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the third aspect or the first possible implementation of the third aspect, in a second possible implementation of the third aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the third aspect to the second possible implementation of the third aspect, in a third possible implementation of the third aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the third aspect to the second possible implementation of the third aspect, in a fourth possible implementation of the third aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the third aspect to the fourth possible implementation of the third aspect, in a fifth possible implementation of the third aspect, the first subframe is a subframe on an unlicensed spectrum.

According to a fourth aspect, an embodiment of the present invention provides a second device, including:

a receiving unit, configured to receive M of N OFDM symbols transmitted by a first device in a first subframe according to a second sequence, where a sequence of the M OFDM symbols sorted according to the first sequence is different from a sequence of the M OFDM symbols sorted according to the second sequence, where the N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N.

With reference to the fourth aspect, in a first possible implementation of the fourth aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the fourth aspect or the first possible implementation of the fourth aspect, in a second possible implementation of the fourth aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the fourth aspect to the second possible implementation of the fourth aspect, in a third possible implementation of the fourth aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the fourth aspect to the second possible implementation of the fourth aspect, in a fourth possible implementation of the fourth aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the fourth aspect to the fourth possible implementation of the fourth aspect, in a fifth possible implementation of the fourth aspect, the first subframe is a subframe on an unlicensed spectrum.

According to a fifth aspect, an embodiment of the present invention provides a first device, including: a processor, a memory, a bus, and a transmitter, where the processor, the memory, and the transmitter are interconnected by using the bus;

the processor is configured to generate T code blocks, and generate N orthogonal frequency division multiplexing OFDM symbols according to the T code blocks, where the N OFDM symbols are sorted according to a first sequence, and the N OFDM symbols are OFDM symbols transmitted in one subframe; and the processor is further configured to transmit, in a first subframe by using the transmitter, M of the N OFDM symbols generated by the processor to a second device according to a second sequence, where a sequence of the M OFDM symbols sorted according to the first sequence is different from a sequence of the M OFDM symbols sorted according to the second sequence, T and N are positive integers, and M is a positive integer less than N.

With reference to the fifth aspect, in a first possible implementation of the fifth aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the fifth aspect or the first possible implementation of the fifth aspect, in a second possible implementation of the fifth aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the fifth aspect to the second possible implementation of the fifth aspect, in a third possible implementation of the fifth aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the fifth aspect to the second possible implementation of the fifth aspect, in a fourth possible implementation of the fifth aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the fifth aspect to the fourth possible implementation of the fifth aspect, in a fifth possible implementation of the fifth aspect, the first subframe is a subframe on an unlicensed spectrum.

According to a sixth aspect, an embodiment of the present invention provides a second device, including: a processor, a memory, a bus, and a receiver, where the processor, the memory, and the receiver are interconnected by using the bus;

the processor is configured to receive, by using the receiver, M of N OFDM symbols transmitted by a first device in a first subframe according to a second sequence, where a sequence of the M OFDM symbols sorted according to the first sequence is different from a sequence of the M OFDM symbols sorted according to the second sequence, where the N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N.

With reference to the sixth aspect, in a first possible implementation of the sixth aspect, T and N are integers not less than 2; and $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

With reference to the sixth aspect or the first possible implementation of the sixth aspect, in a second possible implementation of the sixth aspect, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor (N/T), where floor( ) is a rounding down function, and X, Y, and Z are zero or positive integers.

With reference to any one of the sixth aspect to the second possible implementation of the sixth aspect, in a third possible implementation of the sixth aspect, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

With reference to any one of the sixth aspect to the second possible implementation of the sixth aspect, in a fourth possible implementation of the sixth aspect, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

With reference to any one of the sixth aspect to the fourth possible implementation of the sixth aspect, in a fifth possible implementation of the sixth aspect, the first subframe is a subframe on an unlicensed spectrum.

According to a seventh aspect, an embodiment of the present invention provides a wireless communications system, including a first device and a second device, where the first device is the first device according to the third aspect or any one of the possible implementations of the third aspect, and the second device is the second device according to the fourth aspect or any one of the possible implementations of the fourth aspect; or the first device is the first device according to the fifth aspect or any one of the possible implementations of the fifth aspect, and the second device is the second device according to the sixth aspect or any one of the possible implementations of the sixth aspect.

According to the information transmission method, the device, and the system provided in the embodiments of the present invention, a first device generates T code blocks, generates N OFDM symbols according to the T code blocks, and transmits, in a first subframe, M of the N OFDM symbols to a second device according to a second sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), a Universal Mobile Telecommunications System (Universal Mobile Telecommunications System, UMTS), and a Worldwide Interoperability for Microwave Access (Worldwide Interoperability for Microwave Access, WiMAX) communications system.

It should be understood that in the embodiments of the present invention, a first device or a second device includes but is not limited to user equipment (full spelling in English: User Equipment, UE for short), a mobile station (full spelling in English: Mobile Station, MS for short), a mobile terminal (Mobile Terminal), a mobile telephone (Mobile Telephone), a handset (handset), portable equipment (portable equipment), and the like. The user equipment may communicate with one or more core networks by using a radio access network (full spelling in English: Radio Access Network, RAN for short). For example, the user equipment may be a mobile telephone (or referred to as a "cellular" phone), or a computer having a wireless communication function; or the user equipment may be a portable, pocket-sized, handheld, computer built-in, or in-vehicle mobile apparatus.

In the embodiments of the present invention, the first device or the second device may be a base transceiver station (English full name: Base Transceiver Station, BTS for short) in GSM or CDMA, or may be a NodeB (NodeB) in WCDMA, or may be an evolved NodeB (English full name: evolved Node B, eNB or e-NodeB for short) in LTE, which is not limited in the present invention.

It should be understood that, in the embodiments of the present invention, "first" and "second" are used for distinguishing only, and are not limitative in the embodiments of the present invention.

Figure 1:
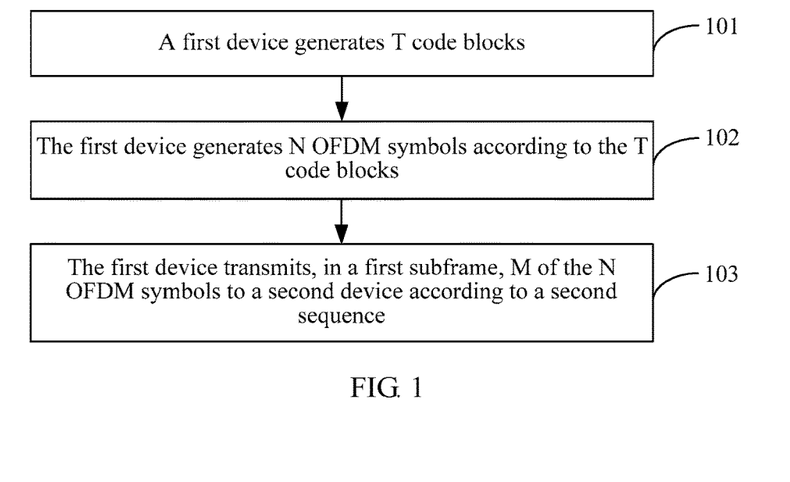
FIG. 1 is a schematic flowchart of an information transmission method according to an embodiment of the present invention.

An embodiment of the present invention provides an information transmission method. Preferably, the method is applied to an LTE system. Referring to FIG. 1, the method includes the following steps.

101. A first device generates T code blocks.

T is a positive integer. In an information transmission process, to ensure information transmission reliability, a transmit end device performs channel encoding on to-be-transmitted information and then sends the information, and a receive end device decodes the information after receiving the information, and restores original data. In an LTE (Long Term Evolution, Long Term Evolution) system, usually, control information is encoded by using a convolutional code, and data information is encoded by using a Turbo code. For example, if a bit length of original information is L, and a bit length after encoding is 3L, a bit rate for encoding is 1/3. A lower bit rate for encoding indicates a lower information transmission rate, but higher information transmission reliability; a higher bit rate for encoding indicates a higher information transmission rate, but lower information transmission reliability.

Optionally, the first device performs channel encoding according to data to generate T code blocks (Code Segment). Usually, during channel encoding, when a length of information bits is greater than a threshold of 6144 bits, the information bits need to be divided into several information bit segments (Information bit segment), and channel encoding is separately performed on each information bit segment to generate one code block. Certainly, an encoding manner in which the first device performs channel encoding is not limited in the present invention. Specifically, optionally, the first device may perform channel encoding according to a convolutional code or a Turbo code. Certainly, the description herein is only an example, and does not mean that the present invention is limited thereto. Preferably, the first device is a base station.

102. The first device generates N OFDM (Orthogonal Frequency Division Multiplexing, orthogonal frequency division multiplexing) symbols according to the T code blocks.

N is a positive integer, the N OFDM symbols are sorted according to a first sequence, and the N OFDM symbols are OFDM symbols transmitted in one subframe.

103. The first device transmits, in a first subframe, M of the N OFDM symbols to a second device according to a second sequence.

A sequence of the M OFDM symbols sorted according to the first sequence is different from a sequence of the M OFDM symbols sorted according to the second sequence, and M is a positive integer less than N.

Preferably, the first subframe is a subframe on an unlicensed spectrum. Optionally, in an application scenario, T and N are integers greater than or equal to 2. $M_1$ of the M OFDM symbols belong to OFDM symbols corresponding to the first code block of the T code blocks, and $M_i$ OFDM symbols belong to OFDM symbols corresponding to the $i^{th}$ code block of the T code blocks, where M is an integer within [2, N), $M_i$ is an integer within [1, M], $$M = \sum_{i=1}^{k} M_i, k \in [2, T], i = (1, 2 \cdots k),$$

and both i and k are integers. Preferably, when the M OFDM symbols are transmitted according to the second sequence, the $M_i$ OFDM symbols corresponding to the $i^{th}$ code block are separately alternated with OFDM symbols corresponding to other code blocks.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), where floor( ) is a rounding down function, and X, Y, and Z are zero or positive integers.

With reference to step 102 and step 103, the information transmission method provided in this embodiment of the present invention aims to transmit as many code blocks as possible by using fewer OFDM symbols, and make a quantity of OFDM symbols corresponding to each code block close. For example, when T=3, a is used to represent OFDM symbols corresponding to the first code block, b is used to represent OFDM symbols corresponding to the second code block, c is used to represent OFDM symbols corresponding to the third code block, and each code block corresponds to four OFDM symbols. Certainly, alternatively, a quantity of OFDM symbols corresponding to each code block may be different. The description herein is only an example. The first device first performs channel encoding according to data to generate three code blocks, then performs encoding and modulation on the three code blocks and maps the code blocks to an RE (Resource Element, resource element) to generate OFDM symbols, and then transmits the OFDM symbols.

In a first case, a symbol sequence may be adjusted during transmission. In this case, OFDM symbols mapped according to the first sequence may be "aaaabbbbcccc", and OFDM symbols transmitted according to the second sequence may be "abcabcabcabc". Because the first subframe may be an incomplete subframe, all OFDM symbols can be transmitted unnecessarily. For example, when M=6, the transmitted OFDM symbols are "abcabc".

In a second case, a symbol sequence may be adjusted during mapping. In this case, OFDM symbols mapped according to the first sequence may be "abcabcabcabc", and OFDM symbols transmitted according to the second sequence may be "abcabcabcabc". In this case, after sequence adjustment during mapping, transmission according to the second sequence may be sequence transmission. In this way, originally, transmission of three code blocks needs 12 OFDM symbols, and by means of the present invention, a transmission sequence of the OFDM symbols is adjusted, so that three code blocks may also be transmitted by using six OFDM symbols. Each code block in the six OFDM symbols corresponds to two OFDM symbols. The receive end device obtains an entire code block through decoding according to the two OFDM symbols corresponding to each code block, thereby saving resources.

Figure 2:
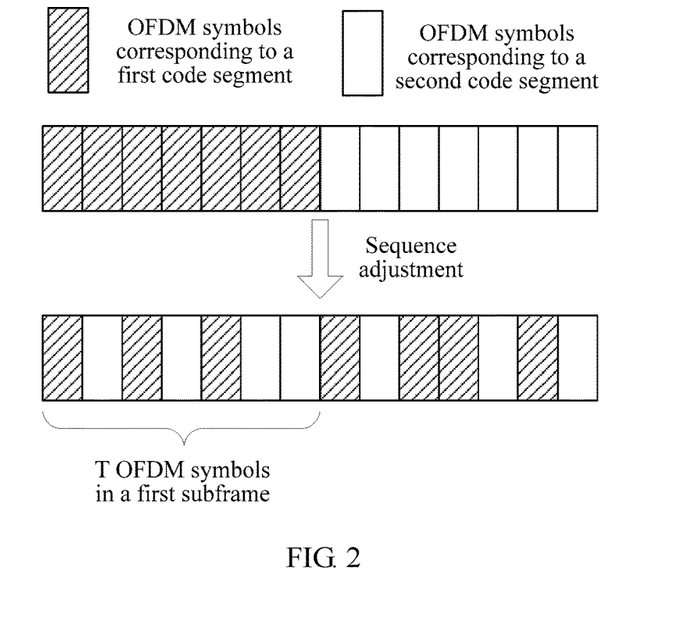
FIG. 2 is a schematic diagram of sequence adjustment of OFDM symbols according to an embodiment of the present invention.

Optionally, with reference to the description of step 102, referring to FIG. 2, in FIG. 2, T=2, N=14, and M=7 are used as an example. Certainly, this does not mean that the present invention is limited thereto.

Corresponding to the first case, if the symbol sequence is adjusted during transmission, numbers of the N OFDM symbols are sequentially 0, 1, . . . 13, and the first sequence is 0, 1, 2, 3, 4, 5, 6, 7, 8, 9, 10, 11, 12, and 13; numbers of the N OFDM symbols according to the first sequence are sequentially 0, 1, . . . 13, and the second sequence is 0, 8, 2, 10, 4, 12, 13, 7, 1, 9, 3, 11, 5, and 6. Corresponding to FIG. 2, the first sequence is a sequence of the OFDM symbols that are numbered, and the second sequence is sequence adjustment performed on the OFDM symbols.

Corresponding to the second case, if the symbol sequence is adjusted during mapping, numbers of the N OFDM symbols are sequentially 0, 1, . . . 13, and the first sequence is 0, 8, 2, 10, 4, 12, 13, 7, 1, 9, 3, 11, 5, and 6; numbers of the N OFDM symbols according to the first sequence are sequentially 0, 1, . . . 13, and the second sequence is 0, 1, 2, 3, 4, 5, 6, 7, 8, 9, 10, 11, 12, and 13. Corresponding to FIG. 2, the first sequence is sequence adjustment performed on the OFDM symbols, and the second sequence is a sequence of the OFDM symbols numbered according to the first sequence.

Certainly, the description herein is only an example. An alternating manner of the OFDM symbols corresponding to the first code block and the OFDM symbols corresponding to the second code block is not limited in the present invention, and may be one-two alternating, two-two alternating, or the like.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

Certainly, the information transmission method provided in this embodiment of the present invention may also be applied to a scenario of transmitting data by using a licensed spectrum. This is not limited in the present invention.

According to the information transmission method provided in this embodiment of the present invention, a first device generates T code blocks, generates N OFDM symbols according to the T code blocks, and transmits, in a first subframe, M of the N OFDM symbols to a second device according to a second sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

With reference to the embodiment corresponding to FIG. 1, another embodiment of the present invention provides an information transmission method. Corresponding to an information receive end in the embodiment shown in FIG. 1, referring to FIG. 3, the method includes the following step.

Figure 3:
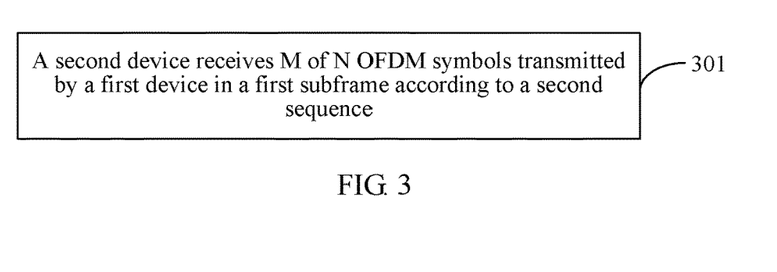
FIG. 3 is a schematic flowchart of an information transmission method according to another embodiment of the present invention.

301. A second device receives M of N OFDM symbols transmitted by a first device in a first subframe according to a second sequence.

A sequence of the M OFDM symbols sorted according to a first sequence is different from a sequence of the M OFDM symbols sorted according to the second sequence.

The N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N. In an information transmission process, to ensure information transmission reliability, a transmit end device performs channel encoding on to-be-transmitted information and then sends the information, and a receive end device decodes the information after receiving the information, and restores original data. In an LTE (Long Term Evolution, Long Term Evolution) system, usually, control information is encoded by using a convolutional code, and data information is encoded by using a Turbo code. For example, if a bit length of original information is L, and a bit length after encoding is 3L, a bit rate for encoding is 1/3. A lower bit rate for encoding indicates a lower information transmission rate, but higher information transmission reliability; a higher bit rate for encoding indicates a higher information transmission rate, but lower information transmission reliability.

Optionally, the first device performs channel encoding according to data to generate T code blocks (Code Segment). Usually, during channel encoding, when a length of information bits is greater than a threshold of 6144 bits, the information bits need to be divided into several information bit segments (Information bit segment), and channel encoding is separately performed on each information bit segment to generate one code block. Certainly, an encoding manner in which the first device performs channel encoding is not limited in the present invention. Specifically, optionally, the first device may perform channel encoding according to a convolutional code or a Turbo code. Certainly, the description herein is only an example, and does not mean that the present invention is limited thereto.

Preferably, the second device may be user equipment. The first subframe is a subframe on an unlicensed spectrum. Optionally, in a specific application scenario, T and N are integers greater than or equal to 2. $M_1$ of the M OFDM symbols belong to OFDM symbols corresponding to the first code block of the T code blocks, and $M_i$ OFDM symbols belong to OFDM symbols corresponding to the $i^{th}$ code block of the T code blocks, where M is an integer within [2, N), is an integer within [1, M], $$M = \sum_{i=1}^{k} M_i, k \in [2, T], i = (1, 2 \cdots k),$$

and both i and k are integers. Preferably, when the M OFDM symbols are transmitted according to the second sequence, the $M_i$ OFDM symbols corresponding to the $i^{th}$ code block are separately alternated with OFDM symbols corresponding to other code blocks.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), where floor( ) is a rounding down function, and X, Y, and Z are zero or positive integers.

T=2, N=14, and M=7 are used as an example. Numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

Alternatively, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

According to the information transmission method provided in this embodiment of the present invention, a second device receives M of N OFDM symbols transmitted by a first device in a first subframe according to a second sequence. A sequence of the M OFDM symbols sorted according to the first sequence is different from a sequence of the M OFDM symbols sorted according to the second sequence. The N orthogonal frequency division multiplexing OFDM symbols are generated by the first device according to T code blocks, the T code blocks are generated by the first device, and the N OFDM symbols are sorted according to the first sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

Figure 4:
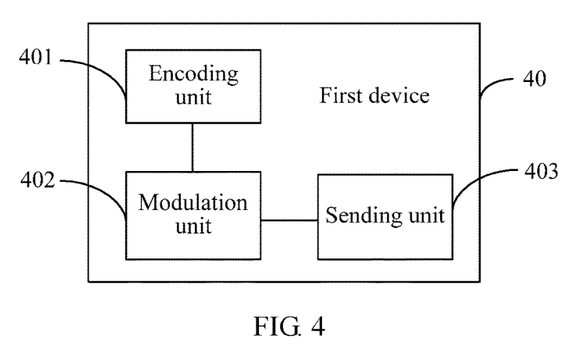
FIG. 4 is a schematic structural diagram of a first device according to an embodiment of the present invention.

Based on the foregoing embodiment corresponding to FIG. 1, an embodiment of the present invention provides a first device, configured to perform the information transmission method described in the foregoing embodiment corresponding to FIG. 1. Referring to FIG. 4, the first device 40 includes: an encoding unit 401, a modulation unit 402, and a sending unit 403.

The encoding unit 401 is configured to generate T code blocks.

The modulation unit 402 is configured to generate N orthogonal frequency division multiplexing OFDM symbols according to the T code blocks generated by the encoding unit, where the N OFDM symbols are sorted according to a first sequence, and the N OFDM symbols are OFDM symbols transmitted in one subframe.

The sending unit 403 is configured to transmit, in a first subframe, M of the N OFDM symbols generated by the modulation unit to a second device according to a second sequence, where a sequence of the M OFDM symbols sorted according to the first sequence is different from a sequence of the M OFDM symbols sorted according to the second sequence, T and N are positive integers, and M is a positive integer less than N.

Preferably, the first subframe is a subframe on an unlicensed spectrum. Optionally, in an application scenario, T and N are integers not less than 2. $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), where floor( ) is a rounding down function, and X, Y, and Z are zero or positive integers.

Preferably, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

Alternatively, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

The first device provided in this embodiment of the present invention generates T code blocks, generates N OFDM symbols according to the T code blocks, and transmits, in a first subframe, M of the N OFDM symbols to a second device according to a second sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

Figure 5:
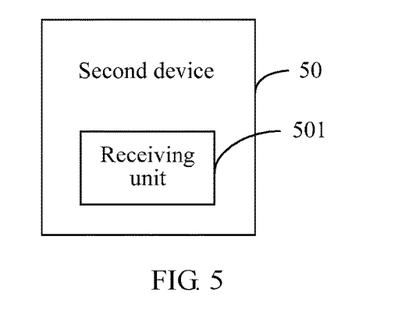
FIG. 5 is a schematic structural diagram of a second device according to an embodiment of the present invention.

Based on the foregoing embodiment corresponding to FIG. 3, an embodiment of the present invention provides a second device, configured to perform the information transmission method described in the foregoing embodiment corresponding to FIG. 3. Referring to FIG. 5, the second device 50 includes: a receiving unit 501.

The receiving unit 501 is configured to receive M of N OFDM symbols transmitted by a first device in a first subframe according to a second sequence, where a sequence of the M OFDM symbols sorted according to a first sequence is different from a sequence of the M OFDM symbols sorted according to the second sequence.

The N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N.

Preferably, the first subframe is a subframe on an unlicensed spectrum. Optionally, in an application scenario, T and N are integers not less than 2. $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), where floor( ) is a rounding down function, and X, Y, and Z are zero or positive integers.

Preferably, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

Alternatively, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

The second device provided in this embodiment of the present invention receives M of N OFDM symbols transmitted by a first device in a first subframe according to a second sequence. A sequence of the M OFDM symbols sorted according to a first sequence is different from a sequence of the M OFDM symbols sorted according to the second sequence. The N orthogonal frequency division multiplexing OFDM symbols are generated by the first device according to T code blocks, the T code blocks are generated by the first device, and the N OFDM symbols are sorted according to the first sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

Figure 6:
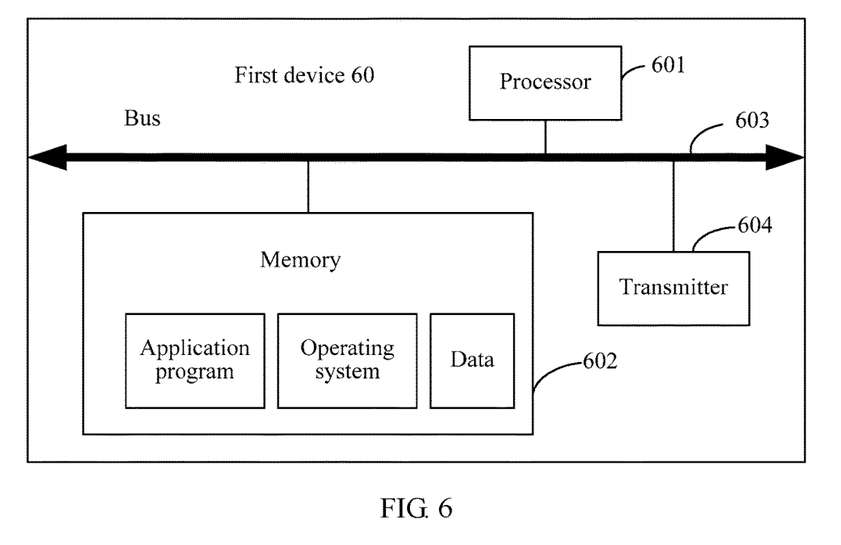
FIG. 6 is a schematic structural diagram of a first device according to another embodiment of the present invention.

Based on the foregoing embodiment corresponding to FIG. 1, another embodiment of the present invention provides a first device, configured to perform the information transmission method in the foregoing embodiment corresponding to FIG. 1. Referring to FIG. 6, the first device 60 includes: at least one processor 601, a memory 602, a bus 603, and a transmitter 604, and the at least one processor 601, the memory 602, and the transmitter 604 are connected by using the bus 603 and complete mutual communication.

The bus 603 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 603 may be classified into an address bus, a data bus, a control bus, and the like. For ease of representation, only a bold line is used for representation in FIG. 6, but it does not represent that there is only one bus or one type of bus.

The memory 602 is used for application program code for executing the solution of the present invention. The application program code for executing the solution of the present invention is stored in the memory, and is controlled and executed by the processor 601.

The memory may be a read-only memory ROM or a static storage device of another type that can store static information and an instruction; a random access memory RAM or a dynamic storage device of another type that can store information and an instruction; or an electrically erasable programmable read-only memory EEPROM, a compact disc read-only memory CD-ROM or other optical disk storages, optical disc storages (including a compact disc, a laser disc, an optical disc, a digital versatile disc, a Blu-ray disc, or the like), a disk storage medium or other disk storages, or any other medium that can be used to carry or store expected program code in an instruction or a data structure form and that can be accessed by a computer, but is not limited thereto. These memories are connected to the processor by using the bus.

The processor 601 may be a central processing unit (Central Processing Unit, CPU for short), an application-specific integrated circuit (Application Specific Integrated Circuit, ASIC for short), or one or more integrated circuits configured to implement this embodiment of the present invention.

The processor 601 is configured to generate T code blocks, and generate N orthogonal frequency division multiplexing OFDM symbols according to the T code blocks, where the N OFDM symbols are sorted according to a first sequence, and the N OFDM symbols are OFDM symbols transmitted in one subframe.

The processor 601 is further configured to transmit, in a first subframe by using the transmitter 604, M of the N OFDM symbols generated by the processor to a second device according to a second sequence, where a sequence of the M OFDM symbols sorted according to the first sequence is different from a sequence of the M OFDM symbols sorted according to the second sequence, T and N are positive integers, and M is a positive integer less than N.

Preferably, the first subframe is a subframe on an unlicensed spectrum. Optionally, in an application scenario, T and N are integers not less than 2. $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), where floor( ) is a rounding down function, and X, Y, and Z are zero or positive integers.

Preferably, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

Alternatively, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

The first device provided in this embodiment of the present invention generates T code blocks, generates N OFDM symbols according to the T code blocks, and transmits, in a first subframe, M of the N OFDM symbols to a second device according to a second sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

Figure 7:
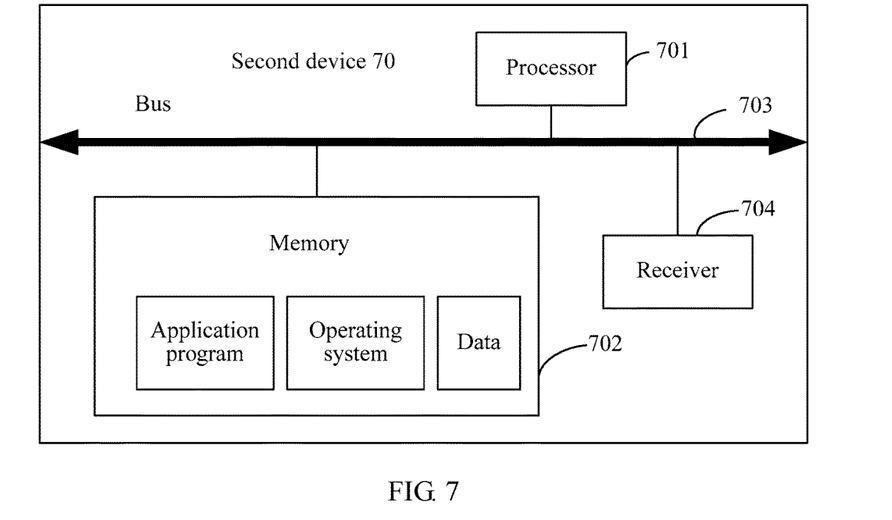
FIG. 7 is a schematic structural diagram of a second device according to another embodiment of the present invention.

Based on the foregoing embodiment corresponding to FIG. 3, another embodiment of the present invention provides a second device, configured to perform the information transmission method described in the foregoing embodiment corresponding to FIG. 3. Referring to FIG. 7, the second device 70 includes: at least one processor 701, a memory 702, a bus 703, and a receiver 704, and the at least one processor 701, the memory 702 and the receiver 704 are connected by using the bus 703 and complete mutual communication.

The bus 703 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 703 may be classified into an address bus, a data bus, a control bus, and the like. For ease of representation, only a bold line is used for representation in FIG. 7, but it does not represent that there is only one bus or one type of bus.

The memory 702 is used for application program code for executing the solution of the present invention. The application program code for executing the solution of the present invention is stored in the memory, and is controlled and executed by the processor 701.

The memory may be a read-only memory ROM or a static storage device of another type that can store static information and an instruction; a random access memory RAM or a dynamic storage device of another type that can store information and an instruction; or an electrically erasable programmable read-only memory EEPROM, a compact disc read-only memory CD-ROM or other optical disk storages, optical disc storages (including a compact disc, a laser disc, an optical disc, a digital versatile disc, a Blu-ray disc, or the like), a disk storage medium or other disk storages, or any other medium that can be used to carry or store expected program code in an instruction or a data structure form and that can be accessed by a computer, but is not limited thereto. These memories are connected to the processor by using the bus.

The processor 701 may be a central processing unit (Central Processing Unit, CPU for short), an application-specific integrated circuit (Application Specific Integrated Circuit, ASIC for short), or one or more integrated circuits configured to implement this embodiment of the present invention.

The processor 701 is configured to receive, by using the receiver 704, M of N OFDM symbols transmitted by a first device in a first subframe according to a second sequence, where a sequence of the M OFDM symbols sorted according to a first sequence is different from a sequence of the M OFDM symbols sorted according to the second sequence.

The N orthogonal frequency division multiplexing OFDM symbols are generated by the first device according to T code blocks, the T code blocks are generated by the first device, the N OFDM symbols are sorted according to the first sequence, and the N OFDM symbols are OFDM symbols transmitted in one subframe, where T and N are positive integers, and M is a positive integer less than N.

Preferably, the first subframe is a subframe on an unlicensed spectrum. Optionally, in an application scenario, T and N are integers not less than 2. $M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, where M is an integer within [2, N), $M_i$ is an integer within [1, M], $$M = \sum_{i=1}^{k} M_i, k \in [2, T-1], i = (1, 2 \cdots k),$$

and both i and k are integers.

Further, optionally, locations of a first symbol and a second symbol of the M OFDM symbols in the M OFDM symbols are Z and Z+1 according to the second sequence, locations of the first symbol and the second symbol in the N OFDM symbols are X and Y according to the first sequence, and $|Y-X| \geq \text{floor}(N/T)$, where floor( ) is a rounding down function, and X, Y, and Z are zero or positive integers.

Preferably, N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

Alternatively, N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

Preferably, the information transmission method provided in this embodiment may be applied to a scenario in which a device preempts an unlicensed spectrum to transmit data. After the first device successfully preempts the unlicensed spectrum, a moment for sending data may be random. Therefore, the moment for sending data by the device may not be a moment at which one complete subframe starts. Herein, that the first subframe is not a complete subframe is used as an example for description. N is 12 or 14, and when a subframe uses a conventional CP (Cyclic Prefix, cyclic prefix), one subframe includes 14 OFDM symbols, and N may be 14; when a subframe uses an extended CP, one subframe includes 12 OFDM symbols. Herein, N=14 is used as an example for description. Because the first subframe is not a complete subframe, a quantity of OFDM symbols included in the first subframe is less than 14. In this case, if encoding is performed according to a predetermined bit rate, a bit length after encoding is a length of 14 OFDM symbols. Consequently, a part of data cannot be transmitted. In this embodiment, it is inconvenient to maintain the original bit rate. After channel encoding is performed according to data to generate T code blocks, encoding and modulation are performed on the T code blocks to generate N OFDM symbols. A sequence of the N OFDM symbols generated during mapping is the first sequence, and during transmission, M of the N OFDM symbols are transmitted in the first subframe according to the second sequence. In this way, as many code blocks as possible may be transmitted in an incomplete subframe, thereby saving resources. In addition, in the prior art, because only a part of data can be transmitted in the incomplete subframe, all of the data needs to be retransmitted. The part of transmitted data wastes resources, and the transmission is meaningless. In the present invention, data is transmitted only once, and resources are also further saved.

The second device provided in this embodiment of the present invention receives M of N OFDM symbols transmitted by a first device in a first subframe according to a second sequence. A sequence of the M OFDM symbols sorted according to a first sequence is different from a sequence of the M OFDM symbols sorted according to the second sequence. The N orthogonal frequency division multiplexing OFDM symbols are generated by the first device according to T code blocks, the T code blocks are generated by the first device, and the N OFDM symbols are sorted according to the first sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

Figure 8:
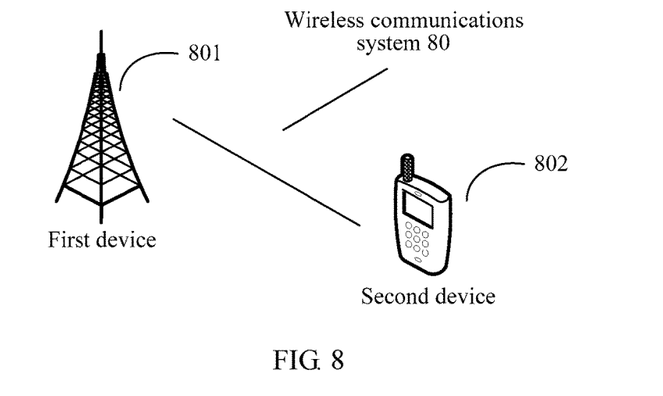
FIG. 8 is a schematic structural diagram of a wireless communications system according to an embodiment of the present invention.

Based on the foregoing embodiments corresponding to FIG. 1 and FIG. 3, an embodiment of the present invention provides a wireless communications system, configured to perform the information transmission methods described in the foregoing embodiments corresponding to FIG. 1 and FIG. 3. Referring to FIG. 8, the wireless communications system 80 includes a first device 801 and a second device 802. Optionally, the first device is a base station, and the second device is user equipment.

The first device 801 is the first device described in the embodiment corresponding to FIG. 4, and the second device 802 is the second device described in the embodiment corresponding to FIG. 5.

Alternatively, the first device 801 is the first device described in the embodiment corresponding to FIG. 6, and the second device 802 is the second device described in the embodiment corresponding to FIG. 7.

According to the wireless communications system provided in this embodiment of the present invention, a first device generates T code blocks, generates N OFDM symbols according to the T code blocks, and transmits, in a first subframe, M of the N OFDM symbols to a second device according to a second sequence. In this way, when it is ensured that a bit rate is unchanged, the M OFDM symbols in the first subframe are used to transmit data included in the N OFDM symbols. Because the bit rate is unchanged, data transmission reliability is ensured, and a prior-art problem that resources are wasted when an incomplete subframe is used to send information after the information is encoded is resolved.

In addition, a computer readable medium is further provided, and includes a computer readable instruction performing the following operations when the computer readable instruction is executed: performing the operations of 101 to 103 or 301 in the methods in the foregoing embodiments.

In addition, a computer program product is further provided, including the foregoing computer readable medium.

It should be noted that: the signaling mentioned herein includes but is not limited to an indication, information, a signal, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read-Only Memory, compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a CD (Compact Disc, compact disc), a laser disc, an optical disc, a DVD disc (Digital Versatile Disc, digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
generating, by a first device, T code blocks;
generating, by the first device, N orthogonal frequency division multiplexing (OFDM) symbols according to the T code blocks, wherein the N OFDM symbols are sorted according to a first sequence, and the N OFDM symbols are OFDM symbols transmitted in one subframe; and
transmitting, by the first device in a first subframe, M of the N OFDM symbols to a second device according to a second sequence, wherein a sequence of the M OFDM symbols sorted according to the first sequence is different from a sequence of the M OFDM symbols sorted according to the second sequence, T and N are positive integers, and M is a positive integer less than N.

2. The method according to claim 1, wherein T and N are integers greater than or equal to 2; and
$M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, wherein M is an integer within [2, N), $M_i$ is an integer within [1, M], $$M = \sum_{i=1}^{k} M_i, k \in [2, T-1], i = (1, 2L\ k),$$

and both i and k are integers.

3. The method according to claim 1, wherein
locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), wherein floor( ) is a rounding down function, and X, Y, and Z are zero or positive integers.

4. The method according to claim 1, wherein
N=14, numbers of the N OFDM symbols are sequentially 0, 1, . . . 13, and the first sequence is 0, 1, 2, 3, 4, 5, 6, 7, 8, 9, 10, 11, 12, and 13; and
the second sequence is 0, 8, 2, 10, 4, 12, 13, 7, 1, 9, 3, 11, 5, and 6.

5. The method according to claim 1, wherein
N=14, numbers of the N OFDM symbols are sequentially 0, 1, . . . 13, and the first sequence is 0, 8, 2, 10, 4, 12, 13, 7, 1, 9, 3, 11, 5, and 6; and
the second sequence is 0, 1, 2, 3, 4, 5, 6, 7, 8, 9, 10, 11, 12, and 13.

6. The method according to claim 1, wherein
the first subframe is a subframe on an unlicensed spectrum.

7. An information transmission method, comprising:
receiving, by a second device, M of N OFDM symbols transmitted by a first device in a first subframe according to a second sequence, wherein a sequence of the M OFDM symbols sorted according to the first sequence is different from a sequence of the M OFDM symbols sorted according to the second sequence, wherein
the N orthogonal frequency division multiplexing (OFDM) symbols are generated by the first device according to T code blocks, the T code blocks are generated by the first device, the N OFDM symbols are sorted according to the first sequence, and the N OFDM symbols are OFDM symbols transmitted in one subframe, wherein T and N are positive integers, and M is a positive integer less than N.

8. The method according to claim 7, wherein T and N are integers greater than or equal to 2; and
$M_i$ of the M OFDM symbols belong to OFDM symbols used by the $i^{th}$ code block of the T code blocks, and when the M OFDM symbols are transmitted according to the second sequence, the M OFDM symbols corresponding to the $i^{th}$ code block are separately alternated with OFDM symbols corresponding to other code blocks, wherein M is an integer within [2, N), $M_i$ is an integer within [1, M], $$M = \sum_{i=1}^{k} M_i, k \in [2, T-1], i = (1, 2L\ k),$$

and both i and k are integers.

9. The method according to claim 7, wherein
locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−X|≥floor(N/T), wherein floor( ) is a rounding down function, and X, Y, and Z are zero or positive integers.

10. The method according to claim 7, wherein
N=14, numbers of the N OFDM symbols are sequentially 0, 1, . . . 13, and the first sequence is 0, 1, 2, 3, 4, 5, 6, 7, 8, 9, 10, 11, 12, and 13; and
the second sequence is 0, 8, 2, 10, 4, 12, 13, 7, 1, 9, 3, 11, 5, and 6.

11. The method according to claim 7, wherein
N=14, numbers of the N OFDM symbols are sequentially 0, 1, . . . 13, and the first sequence is 0, 8, 2, 10, 4, 12, 13, 7, 1, 9, 3, 11, 5, and 6; and
the second sequence is 0, 1, 2, 3, 4, 5, 6, 7, 8, 9, 10, 11, 12, and 13.

12. The method according to claim 7, wherein
the first subframe is a subframe on an unlicensed spectrum.

13. A first device, comprising: a processor, a memory, a bus, and a transmitter, wherein the processor, the memory, and the transmitter are interconnected by the bus;
the processor is configured to generate T code blocks, and generate N orthogonal frequency division multiplexing (OFDM) symbols according to the T code blocks, wherein the N OFDM symbols are sorted according to a first sequence, and the N OFDM symbols are OFDM symbols transmitted in one subframe; and
the transmitter is further configured to transmit, in a first subframe, M of the N OFDM symbols generated by the processor to a second device according to a second sequence, wherein a sequence of the M OFDM symbols sorted according to the first sequence is different from a sequence of the M OFDM symbols sorted according to the second sequence, T and N are positive integers, and M is a positive integer less than N.

14. The first device according to claim 13, wherein T and N are integers greater than or equal to 2; and
$M_i$ of the M OFDM symbols belong to OFDM symbols used by the $i^{th}$ code block of the T code blocks, and when the M OFDM symbols are transmitted according to the second sequence, the $M_i$ OFDM symbols corresponding to the $i^{th}$ code block are separately alternated with OFDM symbols corresponding to other code blocks, wherein M is an integer within [2, N), $M_i$ is an integer within [1, M], $$M = \sum_{i=1}^{k} M_i, k \in [2, T-1], i = (1, 2L\ k),$$

and both i and k are integers.

15. The first device according to claim 13, wherein
locations of a first symbol and a second symbol of the M OFDM symbols in the M OFDM symbols are Z and Z+1 according to the second sequence, locations of the first symbol and the second symbol in the N OFDM symbols are X and Y according to the first sequence, and |Y−|≥floor(N/T), wherein floor( ) is a rounding down function, and X, Y, and Z are zero or positive integers.

16. The first device according to claim 13, wherein
N=14, numbers of the N OFDM symbols are sequentially 0, 1, . . . 13, and the first sequence is 0, 1, 2, 3, 4, 5, 6, 7, 8, 9, 10, 11, 12, and 13; and the second sequence is 0, 8, 2, 10, 4, 12, 13, 7, 1, 9, 3, 11, 5, and 6.

17. The first device according to claim 13, wherein N=14, numbers of the N OFDM symbols are sequentially 0, 1, . . . 13, and the first sequence is 0, 8, 2, 10, 4, 12, 13, 7, 1, 9, 3, 11, 5, and 6; and the second sequence is 0, 1, 2, 3, 4, 5, 6, 7, 8, 9, 10, 11, 12, and 13.

18. The first device according to claim 13, wherein the first subframe is a subframe on an unlicensed spectrum.

* * * * *